(12) United States Patent
Peter et al.

(10) Patent No.: US 11,558,363 B2
(45) Date of Patent: Jan. 17, 2023

(54) METHOD AND DEVICE FOR PROVISIONING A NODE IN A WIRELESS NETWORK

(71) Applicant: Verizon Patent and Licensing Inc., Arlington, VA (US)

(72) Inventors: Neeharika S. Peter, Southlake, TX (US); Andrew Lee Ray, Southlake, TX (US); James D. Shannon, Jackson, NJ (US); Scott Kurzweg, Westerville, OH (US); David Taft, Keller, TX (US); Thomas W. Haynes, Concord, CA (US); Maria G. Lam, Oakland, CA (US); Theresa Marie Rivera, Cranford, NJ (US); Shane Ronan, Lutz, FL (US); Abhitabh Kushwaha, Tampa, FL (US); Sankaran Ramanathan, Bridgewater, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 437 days.

(21) Appl. No.: 16/544,351

(22) Filed: Aug. 19, 2019

(65) Prior Publication Data

US 2021/0058386 A1 Feb. 25, 2021

(51) Int. Cl.
*H04L 29/06* (2006.01)
*H04L 9/40* (2022.01)
(Continued)

(52) U.S. Cl.
CPC ......... *H04L 63/0823* (2013.01); *G06F 21/36* (2013.01); *H04L 63/0876* (2013.01); *H04L 63/107* (2013.01); *H04W 28/26* (2013.01)

(58) Field of Classification Search
CPC ... H04W 12/06; H04W 12/069; H04W 28/26; H04W 12/104; H04W 12/35;
(Continued)

(56) References Cited

U.S. PATENT DOCUMENTS

| 2012/0191769 A1* | 7/2012 | Lovinger | H04L 61/1511 709/201 |
| 2013/0031227 A1* | 1/2013 | Ford | H04L 12/40019 709/222 |

(Continued)

OTHER PUBLICATIONS

Sanneck et al., Auto-Connectivity and Security Setup for Access Network Elements, Jun. 5, 2009, IEEE, pp. 691-705. (Year: 2009).*

(Continued)

*Primary Examiner* — Luu T Pham
*Assistant Examiner* — Jenise E Jackson

(57) ABSTRACT

A device may receive data relating to a site plan and image data relating to a network device. The device may determine a device identifier based on the image data, associate the device identifier with the site plan based on a common attribute between the network device and the site plan, and cause a certificate to be generated based on an authentication request to a network controller. The authentication request may cause the network controller to generate the certificate based on the device identifier and/or the site plan. The device may cause an Internet protocol (IP) address to be assigned to the network device based on the certificate, a location of the network device, and/or another related parameter, cause a node configuration to be generated based on the IP address, the device identifier, and/or the site plan, and provision the network device according to the node configuration.

20 Claims, 8 Drawing Sheets

(51) Int. Cl.
*H04W 28/26* (2009.01)
*G06F 21/36* (2013.01)

(58) Field of Classification Search
CPC ..... H04W 12/63; H04W 12/71; H04W 12/73; H04L 63/0823; H04L 63/0876; H04L 63/107; H04L 9/0872; H04L 9/3263; H04L 9/0866; H04L 63/0892; G06F 21/31; G06F 21/33; G06F 21/36; G06F 21/44; G06F 2221/2111
See application file for complete search history.

(56) References Cited

U.S. PATENT DOCUMENTS

| | | | | |
|---|---|---|---|---|
| 2014/0082701 | A1* | 3/2014 | Pasion | H04L 63/0823 726/4 |
| 2014/0281503 | A1* | 9/2014 | Mills | H04L 63/0823 713/157 |
| 2015/0106517 | A1* | 4/2015 | Saunders | H04W 12/068 709/225 |
| 2015/0264040 | A1* | 9/2015 | Schneider | H04L 63/0823 726/10 |
| 2016/0337945 | A1* | 11/2016 | Watt | H04W 12/08 |
| 2018/0145905 | A1* | 5/2018 | Du | H04L 45/66 |
| 2021/0176123 | A1* | 6/2021 | Plamondon | H04L 41/0816 |

OTHER PUBLICATIONS

Berkowsky et al., CAre: Certificate Authority Rescue Engine for Proactive Security, Jun. 23, 2017, pp. 79-86. (Year: 2017).*

* cited by examiner

METHOD AND DEVICE FOR PROVISIONING A NODE IN A WIRELESS NETWORK

BACKGROUND

A network (e.g., a mobile network) may be distributed over coverage areas or sites that can extend over a wide geographic area and enable a large number of portable transceivers (e.g., computers, smart phones, Internet-of-Things (IoT) devices, and/or other mobile devices) to communicate. A site of a network may include a number of network devices (e.g., baseband units, base stations, routers, modems, switches, gateways, access points, and/or other network devices) that enable the portable transceivers to connect to the network.

DETAILED DESCRIPTION OF PREFERRED EMBODIMENTS

Figure 1A:
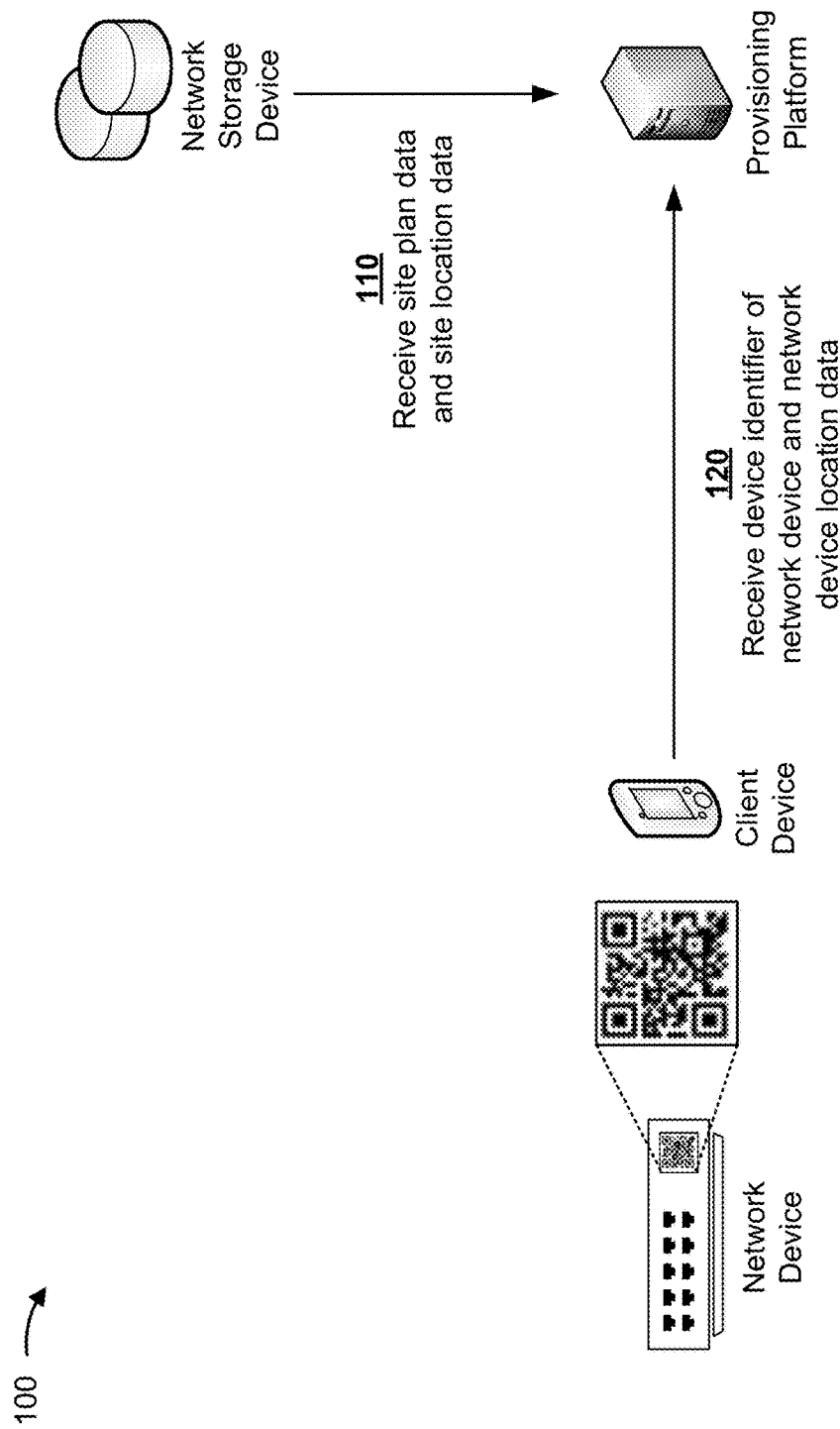
FIGS. 1A-1E are diagrams of one or more example implementations described herein.

The following detailed description of example implementations refers to the accompanying drawings. The same reference numbers in different drawings may identify the same or similar elements.

As reliance on wireless communications becomes more widespread and as network traffic continues to increase, network operators pay closer attention to network usage and performance to ensure that associated network infrastructure can support growing demands. Network operators may monitor network analytics data relating to different coverage areas or sites within a network, and design site plans to add a node or a network device (e.g., a baseband unit, a base station, a router, a modem, a switch, a gateway, an access point, and/or another network device) associated with a target site needing support. The process of adding or provisioning a network device may involve several steps.

The current installation process can be cumbersome, time-consuming, and prone to error and delay, especially when there are multiple network devices to provision and when each network device is associated with a different element management system. Furthermore, current provisioning processes do not provide adequate security measures to prevent unauthorized devices from connecting to a network. This can be a concern especially for modern networks (e.g., 4G networks, 5G networks, New Radio (NR) networks, and/or the like) which may install network devices on fixtures that are accessible to the general public or in unrestricted areas.

Some implementations described herein provide a provisioning platform that assists with provisioning a network device in a network (e.g., a mobile network). The provisioning platform may receive site plan data relating to a site plan from a network storage device, receive a device identifier associated with the network device from a client device, associate the device identifier with the site plan, cause a certificate (e.g., an electronic security certificate and/or another certificate for authenticating the network device via a public certificate authority (CA)) to be generated for the network device based on the device identifier and/or the site plan, cause an Internet protocol (IP) address to be assigned to the network device based on the certificate and/or a location of the network device, cause a node configuration to be generated for the network device based on the IP address, the device identifier, and/or the site plan, and cause the network device to be provisioned according to the node configuration. In some examples, the provisioning platform may determine the device identifier based on an image of a visual code associated with the network device and captured via a client device. In some examples, the provisioning platform may receive location data from the client device corresponding to a location of the network device, and determine whether the location of the network device corresponds to a location of a target site.

In this way, the provisioning platform is able quickly and easily assist with provisioning a network device in a network at a target site according to a site plan in an efficient, consistent, and reliable manner. In particular, the provisioning platform may leverage its direct access to a site project management system, a client device used by a technician, with a custom application that has been developed for this system, and element management systems to gather appropriate information less manual intervention and less risk of error. The provisioning platform also leverages sensor technology available on a client device to ensure that a network device is being installed at an appropriate target site. The provisioning platform prohibits network access to misplaced and/or unauthorized network devices and enhances security and reliability. The provisioning platform may enable network operators to complete new builds and/or upgrades in less time and maintain associated network equipment and/or user equipment in optimal operating condition. The provisioning platform additionally may conserve computational and network resources that network operators may otherwise use to provision a network device.

FIGS. 1A-1E are diagrams of one or more example implementations 100 described herein. As shown in FIGS. 1A-1E, the example implementation(s) 100 may include a provisioning platform, a network storage device, a client device, a network device, a network controller, an IP allocation device, a node configuration device, and an element management device. FIGS. 1A-1E present one or more functions that may be performed by the provisioning platform. For example, the provisioning platform may receive site plan data relating to a site plan, receive a device identifier associated with the network device, associate the device identifier with the site plan, cause a certificate (e.g., an electronic security certificate and/or another certificate for authenticating the network device) to be generated for the network device based on the device identifier and/or the site plan, cause an IP address to be assigned to the network device based on the certificate and/or other network-specific criteria, cause a node configuration to be generated for the network device based on the IP address, the device identifier, and/or the site plan, and cause the network device to be provisioned according to the node configuration. In some implementations, one or more of the functions, described as being performed by the provisioning platform, may be performed by another device, such as the network storage device, the client device, the network device, the network controller, the IP allocation device, the node configuration device, the element management device, and/or the like.

In some implementations, the provisioning platform may be used in association with a provisioning service that is supported by the network storage device, the client device, the network device, the network controller, the IP allocation device, the node configuration device, and/or the element management device. For example, the provisioning service may be used by one or more subscribers (e.g., a network operator, a technician, a carrier, a vendor, and/or the like) to provision a network device (e.g., a 5G integrated node, a 5G non-integrated node, a 4G integrated node, a 4G non-integrated node, an inbuilding node, a standalone node, a daisy-chained node, and/or the like) in a network at a target site according to a site plan. The provisioning service may provide features such as recalling information relating to a site plan for a target site based on a geographic location of a technician, providing an index of network devices to be provisioned for a target site, enabling a technician to scan or capture an image of a visual code associated with a network device to initiate automatic provisioning of the network device, updating an index or an inventory of network devices at a target site, generating indexes of authorized and/or unauthorized network devices for a target site, configuring network devices based on node configurations from various vendors, and/or the like. A subscriber may access the provisioning service using a client device (e.g., a computer, a smart phone, a mobile device, and/or the like) that is connected to the provisioning platform over a wired connection and/or a wireless connection.

As shown in FIG. 1A, and by reference number 110, the provisioning platform may receive data, such as site plan data and site location data from one or more network storage devices. The site plan data may include design specifications for a target site, equipment specifications for the target site, and/or other information that may be used by network operators and/or technicians to carry out the site plan (e.g., to build and/or upgrade network equipment at the target site). For example, the site plan data may include information relating to a geographic location of the target site (e.g., in terms of geographic coordinates, a physical address, and/or the like), information identifying the target site (e.g., a site identification number, a site name, and/or the like), and/or information relating to a network device that is installed or to be installed at the target site (e.g., an index of baseband units, base stations, routers, modems, switches, gateways, access points, and/or the like). The provisioning platform may receive the site location data as part of the site plan data and/or receive the site location data separately from the site plan data. In some examples, the provisioning platform may receive the site plan data and/or the site location data from a client device (e.g., based on information provided by a network operator, a technician, a carrier, a vendor, and/or the like). In some examples, the provisioning platform may automatically receive site plan data of a target site when a technician arrives at the target site (e.g., as determined via a location sensor of a client device used by the technician).

As further shown in FIG. 1A, and by reference number 120, the provisioning platform may receive a device identifier and location data of a network device to be provisioned in a network at a target site. The provisioning platform may receive the device identifier and network device location data from a client device of a technician at the target site. In some implementations, the device identifier may include one or more alphanumeric characters that are specific to the network device and capable of distinguishing the network device from other network devices at the target site, from other devices connected with the network, and/or the like. In some implementations, the device identifier may include a visual code (e.g., a quick response (QR) code, a barcode, a symbol, and/or another visual pattern) that can be recognized by a computer vision model (e.g., using a QR code decoder, a barcode decoder, and/or another image-based analysis) and interpreted as the device identifier. The device identifier may be assigned by a vendor of the network device, a network operator, a technician, a carrier, and/or the like. The device identifier may be printed, stamped, or etched directly on the network device, printed on a label or tag attached to the network device, included in a packaging of the network device, electronically provided via a text message, a short message service (SMS) message, a notification, an alert, electronic mail, and/or the like.

In some implementations, such as if the device identifier is provided using one or more alphanumeric characters, the provisioning platform may enable a technician to manually enter the device identifier via an input device (e.g., a touchscreen, a mouse, a keyboard, a keypad, and/or the like) of the client device. Additionally, or alternatively, the provisioning platform may enable a technician to capture an image of the alphanumeric characters (e.g., captured using a camera of the client device), and submit image data corresponding to the image to be interpreted as the device identifier using a computer vision model (e.g., an optical character recognition (OCR) model and/or another image-based analytic model). In some examples, such as if the device identifier is provided as a visual code, the provisioning platform may enable a technician to capture an image of the visual code, and submit image data corresponding to the visual code to be interpreted as the device identifier using a computer vision model (e.g., a QR code recognition model, a barcode recognition model, and/or the like). In some examples, the client device may transmit the image data to the provisioning platform to be analyzed and interpreted by the provisioning platform. Additionally, or alternatively, the client device may analyze and interpret the image data, and transmit the interpreted device identifier to the provisioning platform.

In some implementations, the provisioning platform may use a computer vision model that has been trained to detect a pattern in the image data, associate the pattern with a visual code, and associate the visual code to a device identifier of the network device. In some examples, the computer vision model may be stored within the provisioning platform and arranged to be accessible to the client device and/or the network storage device. In some examples, features of the computer vision model may be stored within the client device and/or the network storage device, and arranged to be accessible to the provisioning platform, the client device, and/or the network storage device. The computer vision model may be trained by the provisioning platform, the client device, and/or the network storage device. In some implementations, another device (e.g., a server device, a cloud computing device, and/or the like) may train the computer vision model and provide the trained computer vision model for use by the provisioning platform, the client device, and/or the network storage device. Additionally, or alternatively, the provisioning platform may train the computer vision model for use by another device (e.g., a server device, a cloud computing device, and/or the like).

In some implementations, the provisioning platform may use one or more artificial intelligence techniques (e.g., machine learning, deep learning, and/or the like) and/or an associated model (e.g., a computer vision model and/or another image-based analytic model) to better recognize visual codes within image data provided by client devices, and to better associate visual codes to device identifiers of network devices. In some examples, the provisioning platform may perform a training operation to train and/or generate the model. For example, the provisioning platform may portion image data having various visual codes known to be associated with various device identifiers into a training set (e.g., a set of data to train the model), a validation set (e.g., a set of data used to evaluate a fit of the model and/or to fine tune the model), a test set (e.g., a set of data used to evaluate a final fit of the model), and/or the like. In some examples, the provisioning platform may preprocess and/or perform dimensionality reduction to reduce the image data to a minimum feature set. In some examples, the provisioning platform may train the model on this minimum feature set, thereby reducing processing to train the model, and may apply a classification technique, to the minimum feature set.

In some implementations, the provisioning platform may use a classification technique, such as a logistic regression classification technique, a random forest classification technique, a gradient boosting machine learning (GBM) technique, and/or the like, to determine a categorical outcome (e.g., that a visual code is successfully linked to a corresponding device identifier, that a visual code is not successfully linked to a corresponding device identifier, and/or the like). Additionally, or alternatively, the provisioning platform may use a naïve Bayesian classifier technique. In this case, the provisioning platform may perform binary recursive partitioning to split the data of the minimum feature set into partitions and/or branches and use the partitions and/or branches to perform predictions (e.g., that a device identifier is successfully identified, or that a device identifier is not successfully identified). Based on using recursive partitioning, the provisioning platform may reduce utilization of computing resources relative to manual, linear sorting and analysis of data points, thereby enabling use of thousands, millions, or billions of data points to train the model, which may result in a more accurate model than using fewer data points.

Additionally, or alternatively, where the test data includes image data and/or the like, the provisioning platform may use a computer vision technique, such as a convolutional neural network technique to assist in classifying test data (e.g., image data relating to a visual code of a network device) into a particular class (e.g., a class indicating that a visual code is successfully linked to a device identifier, a class indicating that a visual code is not successfully linked to a device identifier, and/or the like). In some cases, the computer vision technique may include using an image recognition technique (e.g., an Inception framework, a ResNet framework, a Visual Geometry Group (VGG) framework, and/or the like), an object detection technique (e.g. a Single Shot Detector (SSD) framework, a You Only Look Once (YOLO) framework, and/or the like), and/or the like.

Additionally, or alternatively, the provisioning platform may train the model (e.g., the computer vision model and/or another image-based analytic model) using a supervised training procedure that includes receiving input to the model from a subject matter expert, which may reduce an amount of time, an amount of processing resources, and/or the like to train the model relative to an unsupervised training procedure. In some examples, the provisioning platform may use one or more other model training techniques, such as a neural network technique, a latent semantic indexing technique, and/or the like. For example, the provisioning platform may perform an artificial neural network processing technique (e.g., using a two-layer feedforward neural network architecture, a three-layer feedforward neural network architecture, and/or the like) to perform pattern recognition with regard to patterns of whether particular information within image data of a visual code can be used to identify an underlying device identifier or not. In this case, using the artificial neural network processing technique may improve an accuracy of a model generated by the provisioning platform by being more robust to noisy, imprecise, or incomplete data, and by enabling the provisioning platform to detect patterns and/or trends undetectable to human analysts or systems using less complex techniques.

In some implementations, the provisioning platform may receive the network device location data from a location sensor (e.g., a GPS sensor and/or the like) of the client device in conjunction with the device identifier. Additionally, or alternatively, the provisioning platform may receive the network device location data based on a site survey of a site location and/or another resource available to the provisioning platform (e.g., via an installer and/or another trusted source, via the network storage device and/or another data structure, and/or the like). The network device location data may include information relating to a geographic location of the network device (e.g., in terms of geographic coordinates, a physical address, and/or the like), and/or information relating to a geographic location of the client device that is in proximity to the network device. For example, if a device identifier of the network device is received from the client device as image data, and if the image data corresponds to an image captured by the client device, the provisioning platform may determine that the client device and the network device are at similar geographic locations and interpret a geographic location of the client device as a geographic location of the network device. In some examples, image data of a device identifier may include the network device location data (e.g., tagged, embedded, or otherwise associated with a geographic location of the client device at a time the corresponding image was captured). Additionally, or alternatively, the provisioning platform may enable manual entry and submission of the network device location data to the provisioning platform. In some examples, the network device location data may indicate when a client device of a technician arrives at a target site, and cause the provisioning platform to receive site plan data for the target site.

Figure 1B:
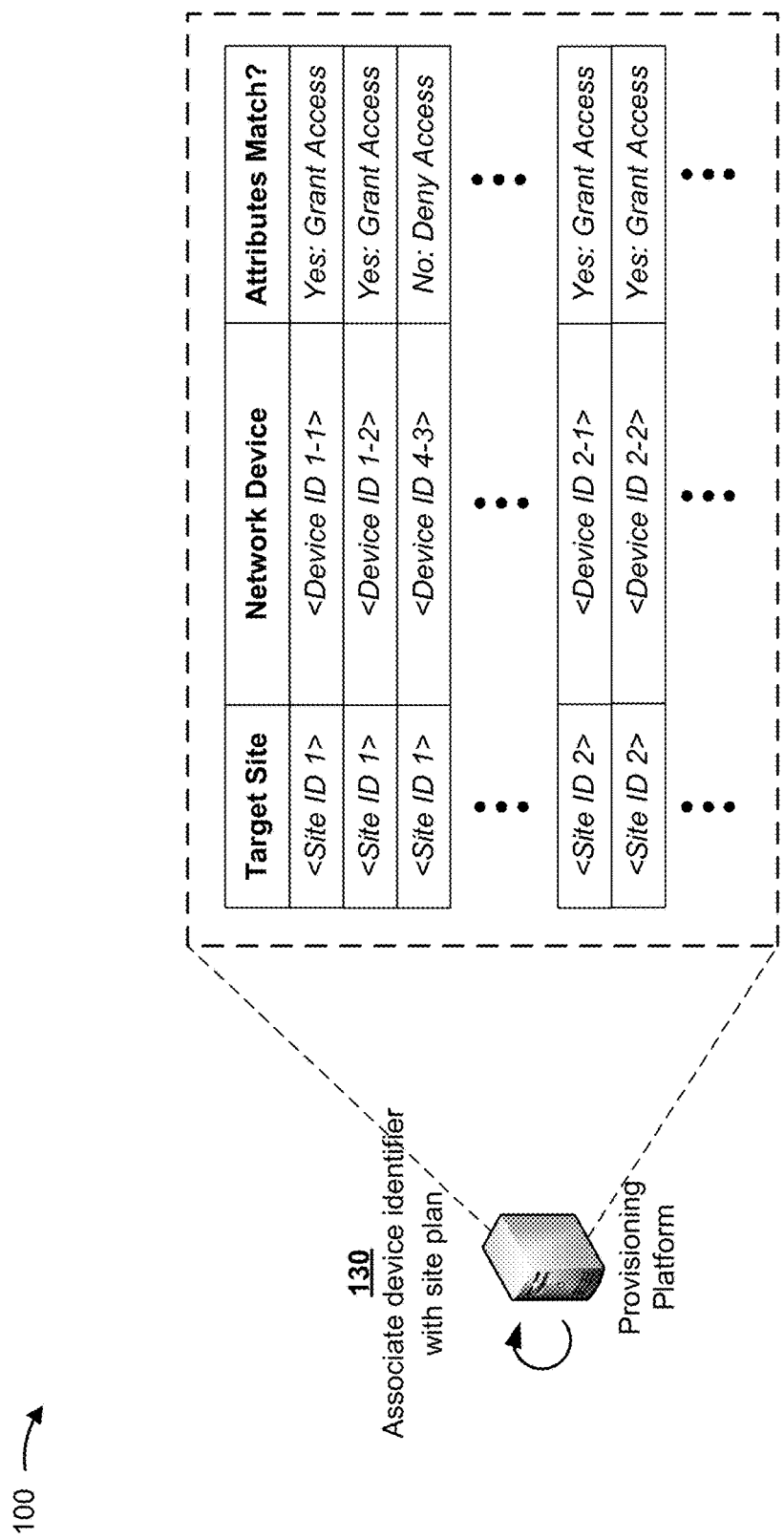

As shown in FIG. 1B, and by reference number 130, the provisioning platform may associate a device identifier of a network device with a site plan based on a common attribute between the network device and the site plan. In some implementations, the provisioning platform may associate the device identifier with the site plan based on correspondence or a proximity between a geographic location of the network device (e.g., as determined from the network device location data) and a geographic location of the target site (e.g., as determined from the site location data). As shown in FIG. 1B, if a geographic location of a network device (e.g., Device ID 1-1) substantially matches (e.g., within a fixed threshold, a configurable threshold, and/or the like) or otherwise corresponds to a geographic location of the target site (e.g., Site ID 1), the provisioning platform may confirm that the network device is located at the target site. In response, the provisioning platform may associate a device identifier of the network device with a site plan corresponding to the target site, and proceed to provision the network device to the target site. If, however, a geographic location of a network device (e.g., Device ID 4-3) does not substantially match or otherwise correspond to the geographic location of the target site (e.g., Site ID 1), the provisioning platform may determine that the network device is not located at the target site, and prohibit association between a device identifier of the network device and the site plan.

In some implementations, the provisioning platform may associate a device identifier of a network device with a site plan based on an index of network devices to be provisioned for a target site, an index of network devices that are authorized for the target site, and/or an index of network devices that are not authorized for the target site. The index may be received as site plan data from a network storage device and/or received from a client device based on information provided by a network operator, a technician, a carrier, a vendor, and/or the like. For example, the index may include a list of device identifiers corresponding to one or more network devices authorized for a target site. The provisioning platform may query the index for an entry substantially matching (e.g., within a fixed threshold, a configurable threshold, and/or the like) the device identifier received from the client device, and associate the device identifier with the site plan if an entry of the index matches the device identifier. If the device identifier received from the client device does not match any of the entries of the index, the provisioning platform may prohibit association between the device identifier and the site plan. A network device that has been prohibited from association with a target site (e.g., due to inconsistent geographic locations, a failed index query, and/or the like) may be prohibited from being provisioned to the target site and/or prohibited from being provisioned in a network associated with the target site.

Figure 1C:
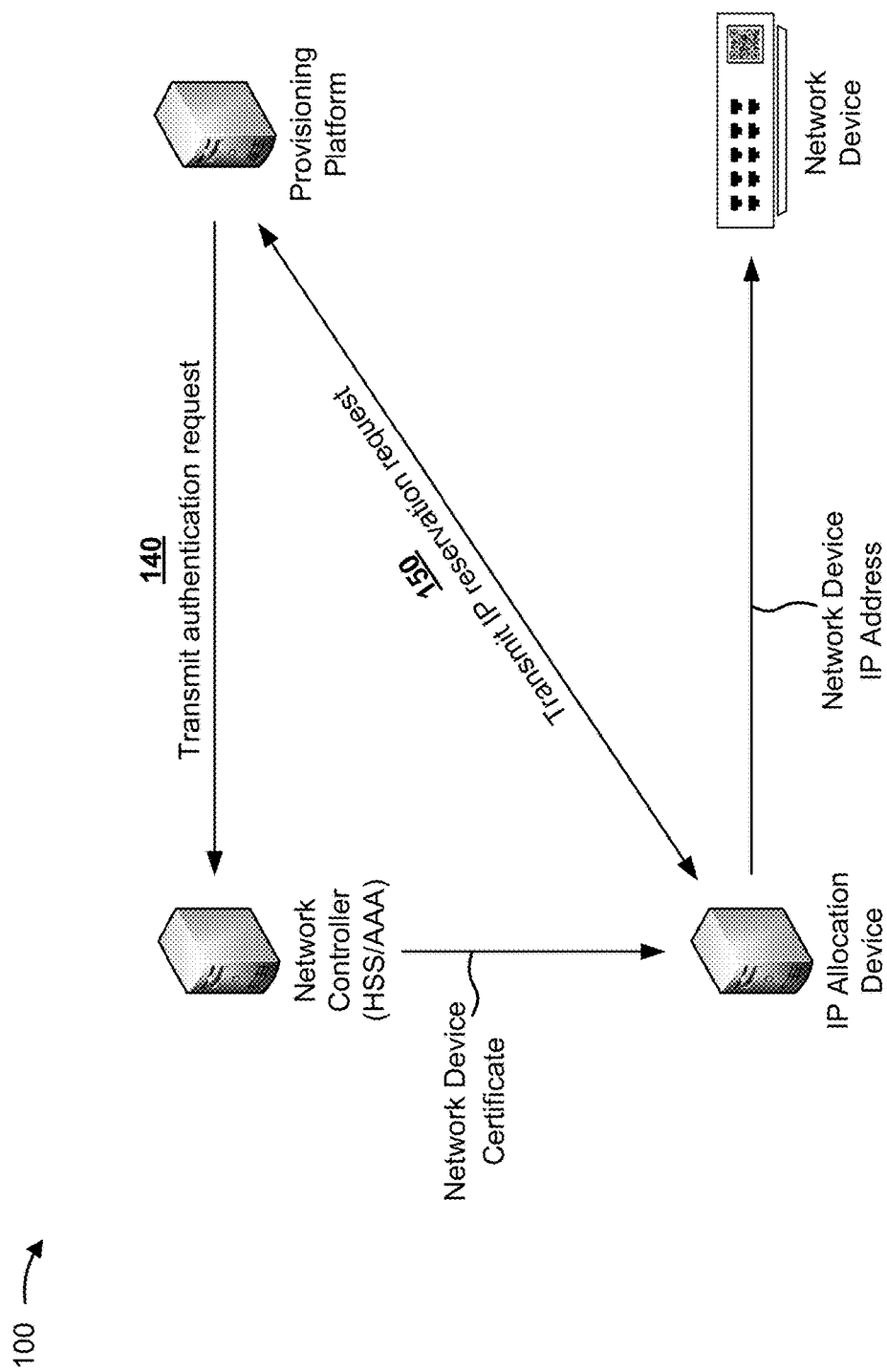

As shown in FIG. 1C, and by reference number 140, the provisioning platform may transmit an authentication request to authenticate a network device associated with a target site. For example, the provisioning platform may transmit the authentication request to a network controller of a network associated with the target site (e.g., a home subscriber server (HSS), an authentication, authorization, and accounting server (AAA), and/or the like). The authentication request may include site plan data, a device identifier of the network device, and/or an instruction to cause the network controller to generate a certificate (e.g., an electronic security certificate and/or another certificate for authenticating the network device) for the network device based on the device identifier and/or the site plan. For example, the certificate may be generated (e.g., using an Institute of Electrical and Electronics Engineers (IEEE) 802.1X protocol and/or the like) to securely enroll the device identifier of the network device with the network, and enable other network equipment within the network to recognize the network device as an authorized network device. In some examples, the certificate may be preconfigured by one or more participants of the site plan and/or the network (e.g., network operators, technicians, carriers, vendors, and/or the like). For added security, the provisioning platform may prohibit the network controller from generating the certificate and enrolling the network device if the device identifier of the network device is not associated with the site plan.

In some implementations, the provisioning platform may maintain a record of a network device that has been denied a certificate and/or that has been prohibited from association with a target site. For example, the provisioning platform may generate an index (e.g., a blacklist) of device identifiers of network devices that have been connected to the network but denied authentication. In some implementations, the provisioning platform may generate an index (e.g., a whitelist) of device identifiers of network devices that have been approved for a certificate and/or authorized for the target site. The provisioning platform may store indexes of authorized and/or unauthorized device identifiers in a data structure of the provisioning platform, a data structure of the network storage device, a data structure of the client device, and/or another data structure that is accessible by the provisioning platform. In some implementations, the indexes of authorized and/or unauthorized device identifiers may be generated and/or maintained by the network controller. In some examples, the indexes of authorized and/or unauthorized device identifiers may be made accessible to the network storage device, the client device, the network controller, and/or the like.

As further shown in FIG. 1C, and by reference number 150, the provisioning platform may transmit an IP reservation request to an IP allocation device (e.g., a dynamic host configuration protocol (DHCP) device and/or the like). For example, the IP reservation request may include site plan data, a device identifier of the network device, and/or an instruction to cause the IP allocation device to assign one or more IP addresses to the network device and/or to the device identifier based on the certificate generated by the network controller, a location of the network device, and/or another related parameter. In some implementations, the network controller may automatically transmit the certificate generated for the network device to the IP allocation device to cause the IP allocation device to assign an IP address for the network device. Once an IP address is assigned to the network device, the IP allocation device may transmit the IP address to the network device and/or transmit a confirmation of the IP address assignment to the provisioning platform. In some examples, the provisioning platform may request and receive confirmation of the IP address assignment from the IP allocation device. In some examples, the provisioning platform may cause the IP allocation device to determine whether the network device should be added to other networks associated with the target site and correspondingly assign additional IP addresses as needed.

Figure 1D:
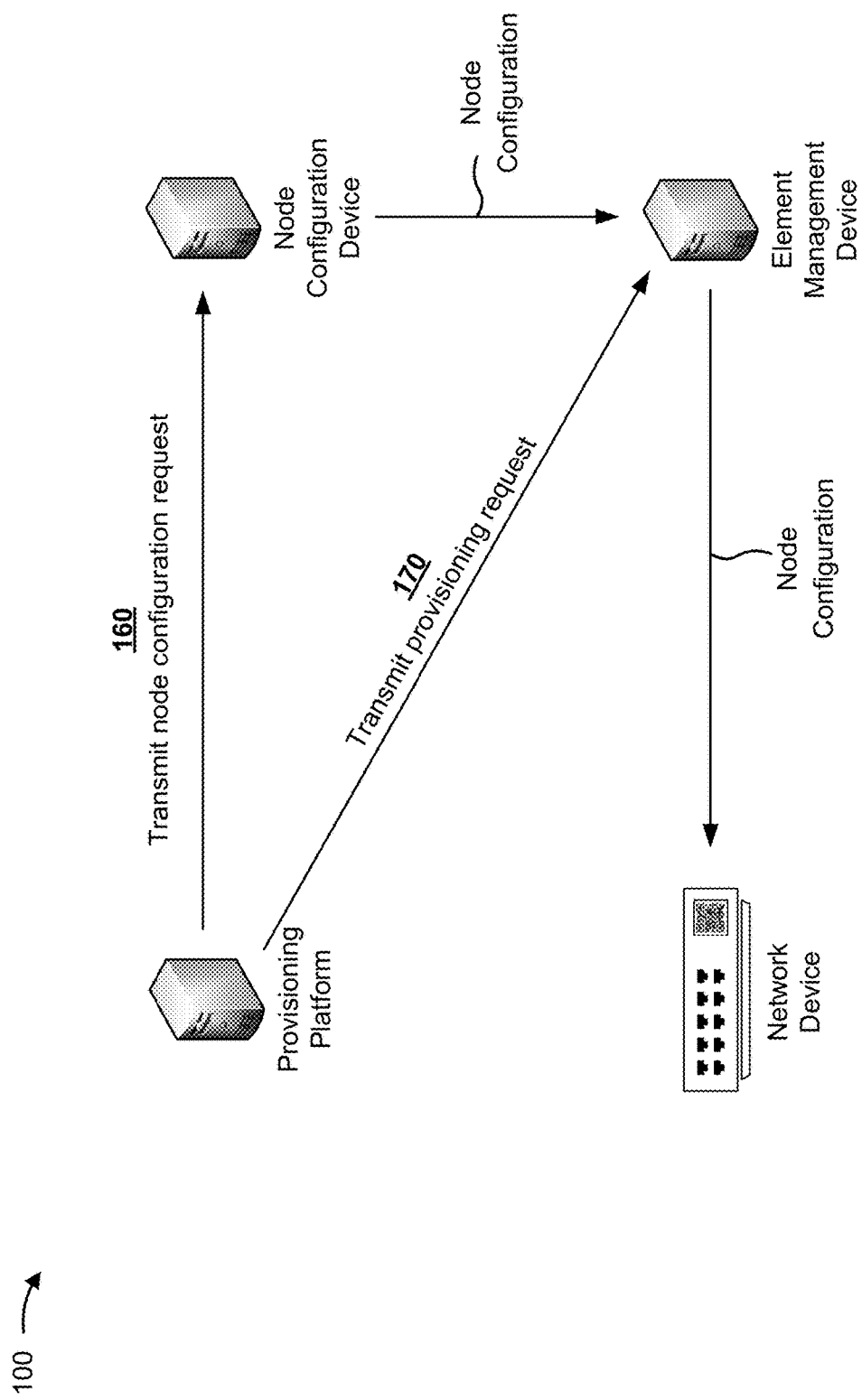

As shown in FIG. 1D, and by reference number 160, the provisioning platform may transmit a node configuration request to a node configuration device. For example, the node configuration request may include site plan data, a device identifier of the network device, an IP address of the network device, and/or an instruction to cause the node configuration device to generate a node configuration (e.g., one or more settings and/or parameters for the network device that enable connectivity with a network) based on the site plan data, the device identifier, and/or the IP address. In particular, the node configuration device may include and/or have access to node configurations for a plurality of different vendors or network device manufacturers, node configurations for a plurality of different carriers, node configurations for a plurality of different networks, and/or the like. The provisioning platform may cause the node configuration device to select the appropriate node configuration to use based on the device identifier of the network device, and generate the node configuration according to the site plan data and the IP address. The provisioning platform may thereby enable network devices from multiple vendors to be easily configured for and provisioned in a network.

As further shown in FIG. 1D, and by reference number 170, the provisioning platform may transmit a provisioning request to an element management device. For example, the provisioning request may include site plan data, a device identifier of the network device, an IP address of the network device, and/or an instruction to cause the network device to be provisioned according to the node configuration provided by the node configuration device. The element management device may ensure that the node configuration provided by the node configuration device is adapted to operate with the specific network device and the network. In some implementations, the element management device may transmit the node configuration to the network device once the element management device receives the node configuration, once the element management device verifies that the associated device identifier corresponds to an authorized network device, and/or once the provisioning request is received from the provisioning platform. Once the network device receives the node configuration and is configured according to the node configuration, the network device may be able to connect to a network associated with a target site. Once the network device is connected to the network, the provisioning platform may receive a status update or a confirmation of the provisioned network device from the element management device, the network device, the network controller, and/or the like.

Figure 1E:
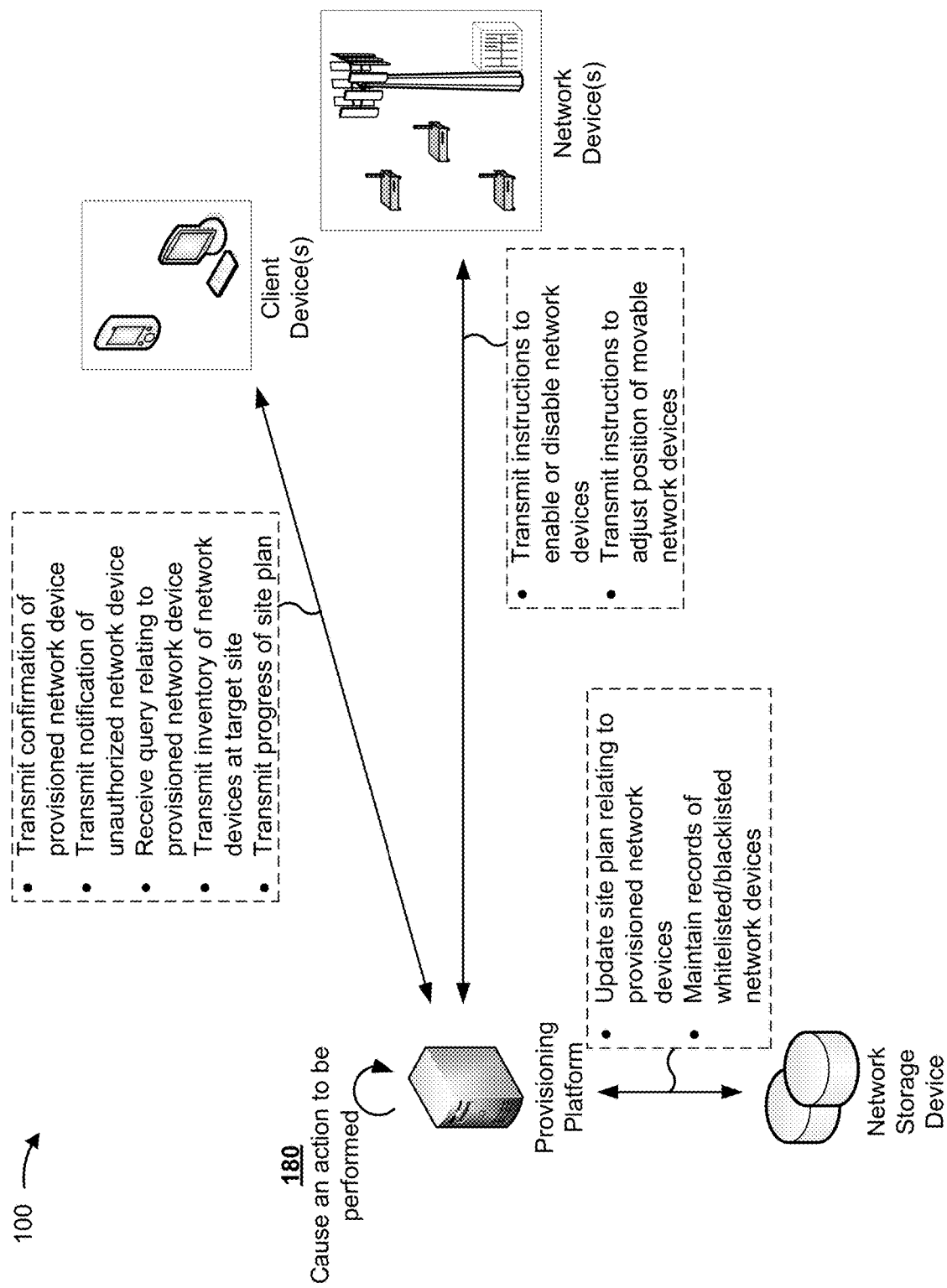

As shown in FIG. 1E, and by reference number 180, the provisioning platform may cause an action to be performed based on a provisioned network device. For example, the provisioning platform may transmit a confirmation of the provisioned network device to a client device to notify a technician of the provisioned network device. The confirmation may include information identifying the provisioned network device, an associated target site, an associated network, an IP address of the network device, a timestamp of the provisioning, and/or the like. In some examples, such as if an unauthorized network device attempted to connect to a target site and/or a network, the provisioning platform may transmit a notification to a client device to notify a technician of the attempted connection. The notification may include information identifying the unauthorized network device, the associated target site, the associated network, a geographic location of the network device, a timestamp of the attempted connection, and/or the like. In some examples, the notification may include and/or refer to an entry of the unauthorized network device to an index (e.g., a blacklist), request confirmation of the entry, enable the technician to edit the entry and/or authorize the network device, and/or the like.

In some implementations, the provisioning platform may receive a query from a client device relating to the provisioned network device. The query may request a provisioning status of the network device, a connection status of the network device, a device identifier of the network device, an IP address of the network device, a node configuration of the network device, site plan data associated with the network device, and/or the like. The provisioning platform may generate a response to the query and transmit the response to the client device. In some examples, the provisioning platform may update an inventory of network devices associated with a target site based on the provisioned network device, and transmit the updated inventory to a client device. The inventory may include an index of network devices connected to the target site, respective device identifiers, and/or other relevant information. Additionally, or alternatively, the provisioning platform may update a site plan associated with the target site based on the provisioned network device, and transmit a progress update of the site plan. The progress update may include information relating to network devices yet to be provisioned, tasks yet to be completed for the target site, and/or the like.

In some implementations, the provisioning platform may transmit an instruction to enable or disable a network device provisioned in a network at a target site. For example, if a misplaced or an unauthorized network device was provisioned in the network, the provisioning platform (e.g., via a network controller of the network and/or the like) may cause the network device to be disabled and/or disconnected from the network. In some examples, if a provisioned network device is determined to be malfunctioning, the provisioning platform may cause the provisioned network device and/or other network devices within the network to be disabled, enabled, and/or otherwise controlled to redirect network traffic. In some examples, the provisioning platform may transmit an instruction to cause a provisioned network device that is movable (e.g., an aerial access point, a mobile base station, and/or the like) to change position in a manner that improves network connectivity and/or performance. In some examples, the provisioning platform may transmit information relating to a provisioned network device to a network storage device in order to update associated site plan data. Additionally, or alternatively, the provisioning platform may transmit information relating to authorized network devices and/or unauthorized network devices in order to update an index (e.g., a whitelist, a blacklist, and/or the like) being maintained by a network storage device.

In this way, the provisioning platform is able quickly and easily assist with provisioning a network device in a network at a target site according to a site plan in an efficient, consistent, and reliable manner. In particular, the provisioning platform may leverage its direct access to a site project management system, a client device used by a technician, and element management systems to gather appropriate information less manual intervention and less risk of error. The provisioning platform also leverages sensor technology available on a client device to ensure that a network device is being installed at an appropriate target site. The provisioning platform prohibits network access to misplaced and/or unauthorized network devices and enhances security and reliability. The provisioning platform may enable network operators to complete new builds and/or upgrades in less time and maintain associated network equipment and/or user equipment in optimal operating condition. The provisioning platform additionally may conserve computational and network resources that network operators may otherwise use to provision a network device.

As indicated above, FIGS. 1A-1E are provided as one or more examples. Other examples can differ from what is described with regard to FIGS. 1A-1E.

Figure 2:
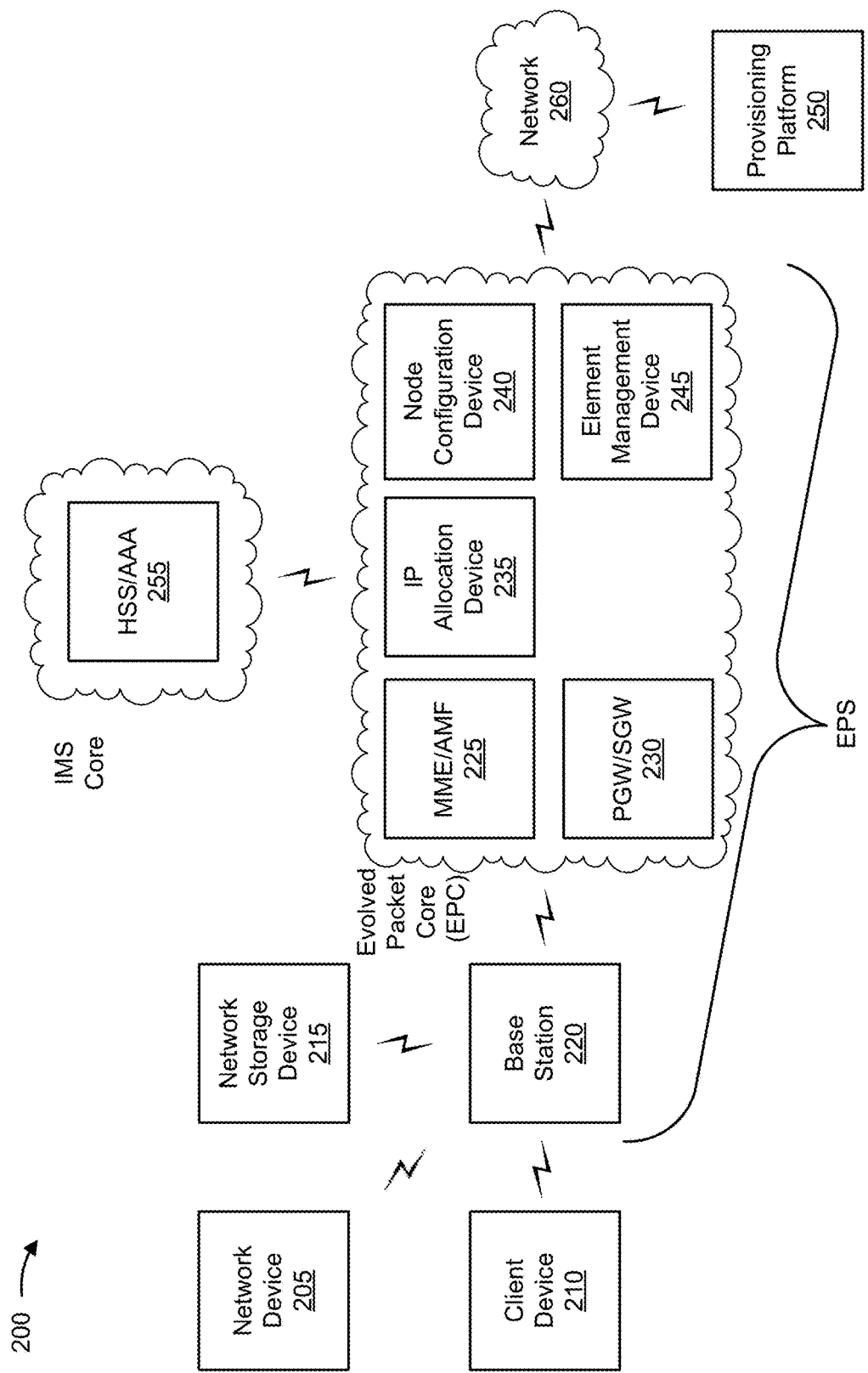
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a network device 205, a client device 210, a network storage device 215, a base station 220, a mobility management entity (MME)/access and mobility management function (AMF) 225, a packet data network gateway (PGW)/a serving gateway (SGW) 230, an IP allocation device 235, a node configuration device 240, an element management device 245, a provisioning platform 250, an HSS/AAA 255, and a network 260. Devices of environment 200 may interconnect via wired connections, wireless connections, or a combination of wired and wireless connections.

Environment 200 includes an evolved packet system (EPS) that includes a long-term evolution (LTE) network, a 5G network, and/or an evolved packet core (EPC). The EPS may include a radio access network (RAN) that includes one or more base stations 220 that take the form of an LTE evolved NodeB (eNB) or a 5G next generation NodeB (gNB) via which network device 205, client device 210, and/or network storage device 215 communicate with the EPC. The EPC may include MME/AMF 225, PGW/SGW 230, and/or the like that enable network device 205, client device 210, and/or network storage device 215 to communicate with network 260 and/or an IP multimedia subsystem (IMS) core. The IMS core may include HSS/AAA 255, and may manage device registration and authentication, session initiation, etc., associated with network device 205, client device 210, and/or network storage device 215. HSS/AAA 255 may reside in the EPC and/or the IMS core.

Network device 205 includes one or more devices capable of receiving, generating, storing, transmitting, processing, and/or routing information. Network device 205 may include, for example, a baseband unit, a base station, a router, a modem, a switch, a gateway, an access point, and/or the like. In some implementations, network device 205 may include a communication interface that allows network device 205 to receive information from and/or transmit information to other devices in environment 200, such as client device 210, network storage device 215, provisioning platform 250, and/or the like.

Client device 210 includes one or more devices capable of receiving, generating, storing, processing, and/or providing information associated with provisioning network device 205. For example, client device 210 may include a computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device. In some implementations, client device 210 may include a communication interface that allows client device 210 to receive information from and/or transmit information to other devices in environment 200, such as network device 205, network storage device 215, provisioning platform 250, and/or the like.

Network storage device 215 includes one or more devices capable of storing, processing, and/or routing information. Network storage device 215 may include, for example, a computing device, a device that stores a data structure, a device in a cloud computing environment or a data center, a device in a core network of a network operator, a network controller, and/or the like. In some implementations, network storage device 215 may include a communication interface that allows network storage device 215 to receive information from and/or transmit information to other devices in environment 200, such as network device 205, client device 210, provisioning platform 250, and/or the like.

Base station 220 includes one or more devices capable of transferring traffic, such as audio, video, text, and/or other traffic, destined for and/or received from network device 205, client device 210, and/or network storage device 215. In some implementations, base station 220 may include an eNB or a gNB associated with the EPS that receives traffic from and/or sends traffic to network 260 via PGW/SGW 230 and/or the like. Additionally, or alternatively, one or more base stations 220 may be associated with a RAN that is not associated with the EPS. In some implementations, base station 220 may be associated with a transport access authentication device. Base station 220 may send traffic to and/or receive traffic from network device 205, client device 210, and/or network storage device 215 via an air interface. In some implementations, base station 220 may include a small cell base station, such as a base station of a microcell, a picocell, and/or a femtocell.

In some implementations, base station 220 may perform scheduling and/or resource management for network device 205, client device 210, and/or network storage device 215 covered by base station 220 (e.g., network device 205, client device 210, and/or network storage device 215 within an area covered by base station 220). In some implementations, base station 220 may be controlled or coordinated by a network controller, which can perform load balancing, network-level configuration, and/or the like. The network controller may include an HSS module or component, an AAA module or component, an operation, administration, and maintenance (OAM) module or component, a self-organizing network (SON) module or component, and/or a similar module or component. The network controller may communicate with base station 220 via a wireless or wireline backhaul. In some implementations, base station 220 may include a network controller and perform network control, scheduling, and/or network management functions (e.g., for other base stations 220 and/or for uplink, downlink, and/or sidelink communications of network device 205, client device 210, and/or network storage device 215 covered by base station 220). In some implementations, base station 220 may include a central unit and multiple distributed units. The central unit may coordinate access control and communication with regard to the multiple distributed units. The multiple distributed units may provide network device 205, client device 210, network storage device 215, and/or other base stations 220 with access to network 260.

MME/AMF 225 includes one or more devices, such as one or more computing devices, capable of managing authentication, activation, deactivation, and/or mobility functions associated with network device 205. In some implementations, MME/AMF 225 may perform operations relating to authentication of network device 205. Additionally, or alternatively, MME/AMF 225 may facilitate the selection of a particular PGW/SGW 230 to serve traffic to and/or from network device 205. MME/AMF 225 may perform operations associated with handing off network device 205 from a first base station 220 to a second base station 220 when network device 205 is transitioning from a first coverage area associated with the first base station 220 to a second coverage area associated with the second base station 220. Additionally, or alternatively, MME/AMF 225 may select another MME/AMF (not shown), to which network device 205 should be handed off (e.g., when network device 205 moves out of range of MME/AMF 225).

PGW/SGW 230 includes one or more devices capable of routing packets. For example, PGW/SGW 230 may include one or more data processing and/or traffic transfer devices, such as a gateway, a router, a modem, a switch, a firewall, a network interface card (MC), a hub, a bridge, a server device, an optical add/drop multiplexer (OADM), or any other type of device that processes and/or transfers traffic. In some implementations, PGW/SGW 230 may aggregate traffic received from one or more base stations 220 associated with the EPS, and may send the aggregated traffic to network 260 and/or other network devices associated with the EPC and/or the IMS core. PGW/SGW 230 may also receive traffic from network 260 and/or other network devices, and may send the received traffic to network device 205 via base station 220. Additionally, or alternatively, PGW/SGW 230 may perform operations associated with handing off network device 205 to and/or from an EPS.

IP allocation device 235 includes one or more devices, such as one or more computing devices, capable of receiving, generating, storing, processing, and/or providing information that relates to allocating and/or assigning an IP address and/or another network address to network device 205, as described in further detail elsewhere herein. For example, IP allocation device 235 may include a DHCP module or component which receives a certificate (e.g., authenticated using an IEEE 802.1X protocol and/or the like) from HSS/AAA 255 and assigns an IP address to network device 205 based on the certificate. IP allocation device 235 may assign the IP address to network device 205 using an unreserved IP address that enables network device 205 to connect to network 260 and communicate with other network devices 205.

Node configuration device 240 includes one or more devices, such as one or more computing devices, capable of receiving, generating, storing, processing, and/or providing information that relates to generating a node configuration (e.g., one or more network settings and/or parameters) that enables network device 205 to connect to network 260, as described in further detail elsewhere herein. Node configuration device 240 may include and/or have access to node configurations for a plurality of different vendors or network device manufacturers, node configurations for a plurality of different carriers, node configurations for a plurality of different networks, and/or the like. Node configuration device may generate the node configuration for network device 205 based on the IP address and associated network 260.

Element management device 245 includes one or more devices, such as one or more computing devices, capable of receiving, generating, storing, processing, and/or providing information that relates to provisioning network device 205, as described in further detail elsewhere herein. For example, element management device 245 may conform the node configuration provided by node configuration device 240 to operate with network device 205 and/or network 260, and transmit the node configuration to network device 205. Element management device 245 may provision network device 205 according to the node configuration and provide confirmation once network device 205 is successfully provisioned to network 260.

Provisioning platform 250 includes one or more devices, such as one or more computing devices, capable of receiving, generating, storing, processing, and/or providing information that relates to provisioning network device 205, as described in further detail elsewhere herein. For example, provisioning platform 250 may receive site plan data relating to a site plan from network storage device 215, receive a device identifier associated with network device 205 from client device 210, associate the device identifier with the site plan, cause a certificate to be generated for network device 205 based on the device identifier and/or the site plan, cause an IP address to be assigned to network device 205 based on the certificate, cause a node configuration to be generated for network device 205 based on the IP address, the device identifier, and/or the site plan, and cause network device 205 to be provisioned according to the node configuration.

HSS/AAA 255 may include one or more devices, such as one or more computing devices, capable of managing (e.g., receiving, generating, storing, processing, and/or providing) information associated with network device 205, as described in further detail elsewhere herein. For example, HSS/AAA 255 may manage subscription information associated with network device 205, such as information that identifies a subscriber profile of a user associated with network device 205, information that identifies services and/or applications that are accessible to network device 205, location information associated with network device 205, an IP address and/or another network address that identifies network device 205, information that identifies a treatment of network device 205 (e.g., quality of service information, a quantity of minutes allowed per time period, a quantity of data consumption allowed per time period, and/or the like), and/or similar information.

In some implementations, HS S/AAA 255 may perform authentication, authorization, and/or accounting operations for communication sessions associated with network device 205. For example, HSS/AAA 255 may perform authentication operations for network device 205 and/or a user of network device 205 (e.g., using one or more credentials), may control access, by network device 205, to a service and/or an application (e.g., based on one or more restrictions, such as time-of-day restrictions, location restrictions, single or multiple access restrictions, read/write restrictions, and/or the like), may track resources consumed by network device 205 (e.g., a quantity of voice minutes consumed, a quantity of data consumed, and/or the like), and/or may perform similar operations. HSS/AAA 255 may provide this information to one or more other devices of environment 200 to support the operations performed by those devices.

Network 260 includes one or more wired and/or wireless networks. For example, network 260 may include a cellular network (e.g., an LTE network, a 5G network, a 3G network, a code division multiple access (CDMA) network, and/or the like), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
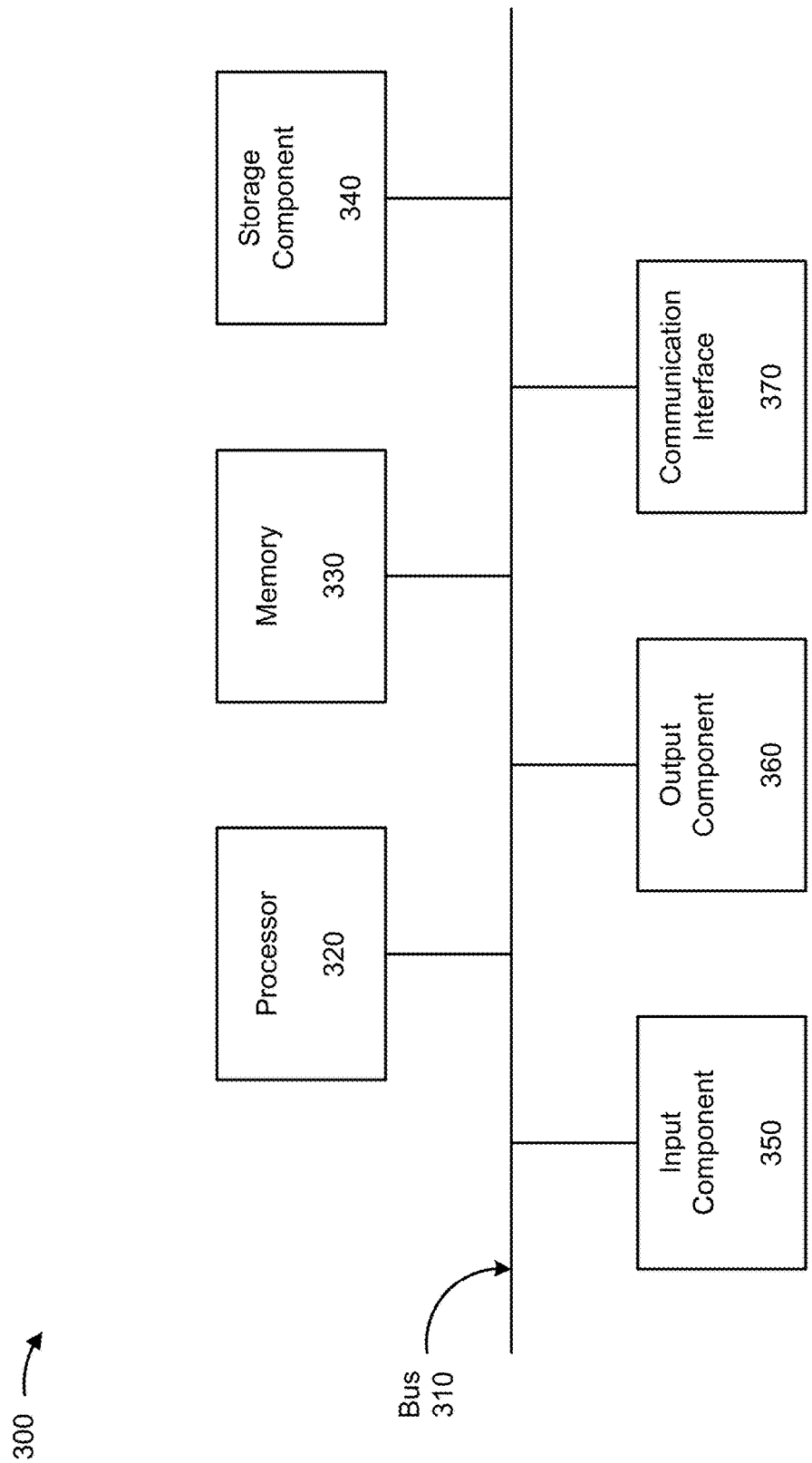
FIG. 3 is a diagram of example components of one or more devices of FIG. 2.

FIG. 3 is a diagram of example components of a device 300. Device 300 may correspond to network device 205, client device 210, network storage device 215, base station 220, MME/AMF 225, PGW/SGW 230, IP allocation device 235, node configuration device 240, element management device 245, provisioning platform 250, and/or HSS/AAA 255. In some implementations, network device 205, client device 210, network storage device 215, base station 220, MME/AMF 225, PGW/SGW 230, IP allocation device 235, node configuration device 240, element management device 245, provisioning platform 250, and/or HSS/AAA 255 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
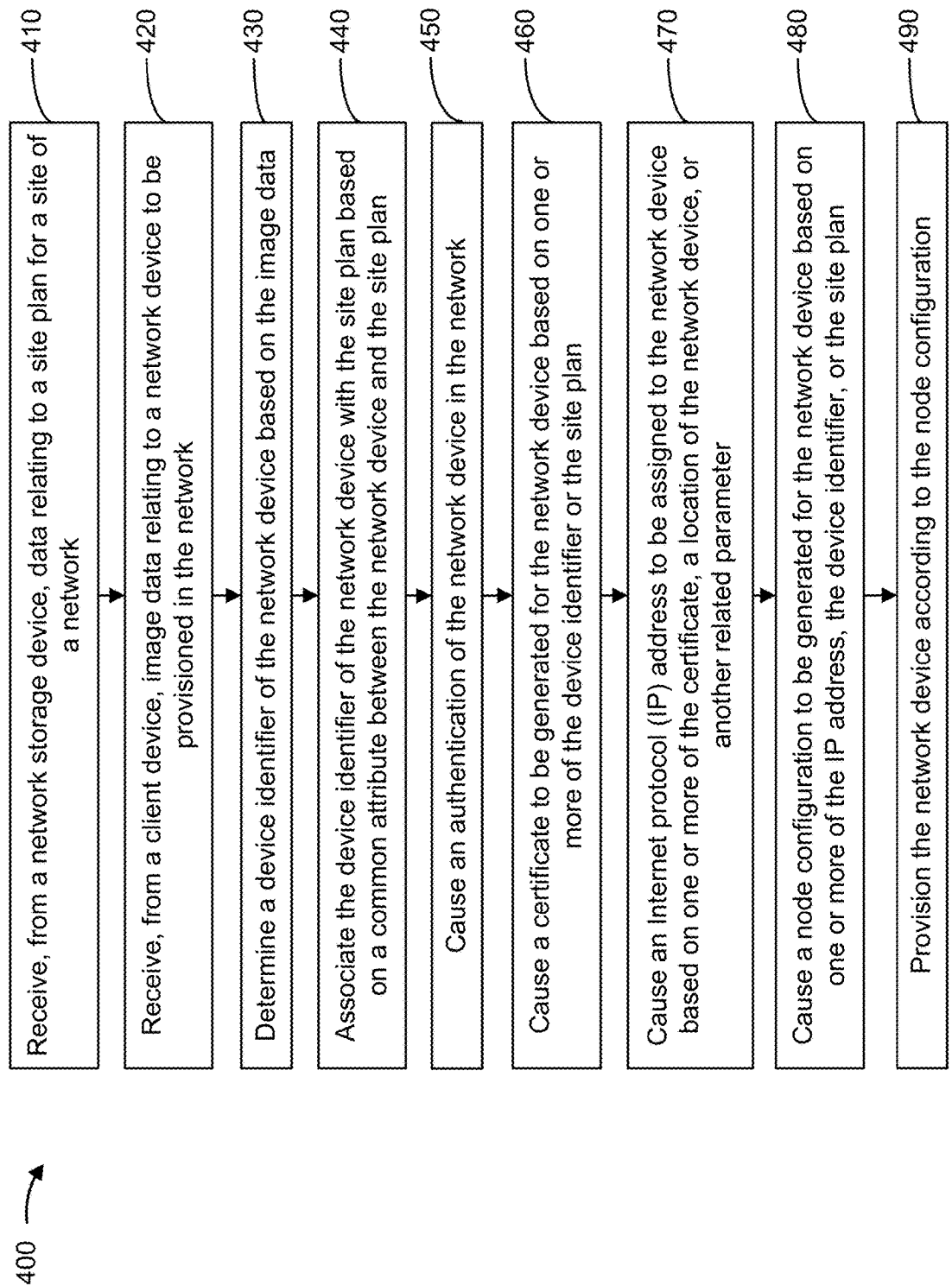
FIG. 4 is a flow chart of an example process for automatically provisioning a node in a network.

FIG. 4 is a flow chart of an example process 400 for automatically provisioning a node in a network. In some implementations, one or more process blocks of FIG. 4 may be performed by a provisioning platform (e.g., provisioning platform 250). In some implementations, one or more process blocks of FIG. 4 may be performed by another device or a group of devices separate from or including the provisioning platform, such as a network device (e.g., network device 205), a client device (e.g., client device 210), or a network storage device (e.g., network storage device 215).

As shown in FIG. 4, process 400 may include receiving site plan data relating to a site plan for a site of a network (block 410). For example, the provisioning platform (e.g., using a processor 320, a memory 330, a storage component 340, an input component 350, a communication interface 370, and/or the like) may receive site plan data relating to a site plan for a site of a network, as described above. In some implementations, the provisioning platform may receive the site plan data from a network storage device. The site plan data may include design specifications for a target site, equipment specifications for the target site, and/or other information that may be used by network operators and/or technicians to carry out the site plan. For example, the site plan data may include information relating to a geographic location of the target site, information identifying the target site, and/or information relating to a network device that is installed or to be installed at the target site. The provisioning platform may receive site location data as part of the site plan data and/or receive the site location data separately from the site plan data. In some examples, the provisioning platform may receive the site plan data and/or the site location data from a client device. In some examples, the provisioning platform may automatically receive site plan data of a target site when a technician arrives at the target site.

As shown in FIG. 4, process 400 may include receiving image data relating to a network device to be provisioned in the network (block 420). For example, the provisioning platform (e.g., using a processor 320, a memory 330, a storage component 340, an input component 350, a communication interface 370, and/or the like) may receive image data relating to a network device to be provisioned in the network, as described above. In some implementations, the provisioning platform may receive the image data from a camera of a client device. The image data may relate to a device identifier of the network device. For example, the image data may correspond to an image of a device identifier having one or more alphanumeric characters that are specific to the network device and capable of distinguishing the network device from other network devices at the target site, from other devices connected with the network, and/or the like. In some examples, the image data may correspond to an image of a device identifier having a visual code that can be recognized by a computer vision model and interpreted as the device identifier. In some examples, the provisioning platform may receive network device location data from a location sensor of the client device in conjunction with the image data.

As shown in FIG. 4, process 400 may include determining a device identifier of the network device based on the image data (block 430). For example, the provisioning platform (e.g., using a processor 320, a memory 330, a storage component 340, and/or the like) may determine a device identifier of the network device based on the image data, as described above. In some implementations, such as if the image data corresponds to an image of one or more alphanumeric characters, the provisioning platform may use a computer vision model to determine the device identifier contained in the image. In some examples, such as if the image data corresponds to an image of a visual code, the provisioning platform may use a computer vision model to interpret the device identifier associated with the visual code. In some examples, the client device may transmit the image data to the provisioning platform to be analyzed and interpreted by the provisioning platform. Additionally, or alternatively, the client device may analyze and interpret the image data, and transmit the interpreted device identifier to the provisioning platform.

As further shown in FIG. 4, process 400 may include associating the device identifier of the network device with the site plan based on a common attribute between the network device and the site plan (block 440). For example, the provisioning platform (e.g., using a processor 320, a memory 330, a storage component 340, and/or the like) may associate the device identifier of the network device with the site plan based on a common attribute between the network device and the site plan, as described above. In some implementations, the provisioning platform may associate the device identifier with the site plan based on correspondence or a proximity between a geographic location of the network device and a geographic location of the target site. For example, if a geographic location of a network device substantially matches (e.g., within a fixed threshold, a configurable threshold, and/or the like) or otherwise corresponds to a geographic location of the target site, the provisioning platform may confirm that the network device is located at the target site. In response, the provisioning platform may associate a device identifier of the network device with a site plan corresponding to the target site, and proceed to provision the network device to the target site. If, however, a geographic location of a network device does not substantially match or otherwise correspond to the geographic location of the target site, the provisioning platform may determine that the network device is not located at the target site, and prohibit association between a device identifier of the network device and the site plan.

In some implementations, the provisioning platform may associate a device identifier of a network device with a site plan based on an index of network devices to be provisioned for a target site, an index of network devices that are authorized for the target site, and/or an index of network devices that are not authorized for the target site. The index may be received as site plan data from a network storage device and/or received from a client device based on information provided by a network operator, a technician, a carrier, a vendor, and/or the like. For example, the index may include a list of device identifiers corresponding to one or more network devices authorized for a target site. The provisioning platform may query the index for an entry substantially matching (e.g., within a fixed threshold, a configurable threshold, and/or the like) the device identifier received from the client device, and associate the device identifier with the site plan if an entry of the index matches the device identifier. If the device identifier received from the client device does not match any of the entries of the index, the provisioning platform may prohibit association between the device identifier and the site plan. A network device that has been prohibited from association with a target site may be prohibited from being provisioned to the target site and/or prohibited from being provisioned in a network associated with the target site.

As further shown in FIG. 4, process 400 may include causing an authentication of the network device in the network (block 450). For example, the provisioning platform (e.g., using a processor 320, a memory 330, a storage component 340, an output component 360, a communication interface 370, and/or the like) may cause an authentication of the network device in the network, as described above. In some implementations, the provisioning platform may transmit an authentication request to a network controller (e.g., a HSS, an AAA, and/or the like) of the network. The authentication request may include site plan data, a device identifier of the network device, and/or other information for enabling the network controller to authenticate the network device in the network.

As further shown in FIG. 4, process 400 may include causing a certificate to be generated for the network device based on one or more of the device identifier or the site plan, wherein the certificate enables enrollment of the network device with the network (block 460). For example, the provisioning platform (e.g., using a processor 320, a memory 330, a storage component 340, an output component 360, a communication interface 370, and/or the like) may cause a certificate to be generated for the network device based on one or more of the device identifier or the site plan, as described above. In some implementations, the certificate may be generated based on an authentication request that is transmitted to a network controller (e.g., a HSS, an AAA, and/or the like) of the network. For example, the authentication request may cause the network controller to generate the certificate for the network device based on one or more of the device identifier or the site plan. In some examples, the certificate may enable enrollment of the network device with the network. The certificate may be adapted to securely enroll the device identifier of the network device with the network, and enable other network equipment within the network to recognize the network device as an authorized network device. For added security, the provisioning platform may prohibit the network controller from generating the certificate and enrolling the network device if the device identifier of the network device is not associated with the site plan.

In some implementations, the provisioning platform may maintain a record of a network device that has been denied a certificate and/or that has been prohibited from association with a target site. For example, the provisioning platform may generate an index of device identifiers of network devices that have been connected to the network but denied authentication. In some implementations, the provisioning platform may generate an index of device identifiers of network devices that have been approved for a certificate and/or authorized for the target site. The provisioning platform may store indexes of authorized and/or unauthorized device identifiers in a data structure of the provisioning platform, a data structure of the network storage device, a data structure of the client device, and/or another data structure that is accessible by the provisioning platform. In some implementations, the indexes of authorized and/or unauthorized device identifiers may be generated and/or maintained by the network controller. In some examples, the indexes of authorized and/or unauthorized device identifiers may be made accessible to the network storage device, the client device, the network controller, and/or the like.

As further shown in FIG. 4, process 400 may include causing an IP address to be assigned to the network device based on one or more of the certificate, a location of the network device, or another related parameter (block 470). For example, the provisioning platform (e.g., using a processor 320, a memory 330, a storage component 340, an output component 360, a communication interface 370, and/or the like) may cause an IP address to be assigned to the network device based on the certificate, as described above. In some implementations, the provisioning platform may transmit an IP reservation request to an IP allocation device. The IP reservation request may include site plan data, a device identifier of the network device, and/or an instruction to cause the IP allocation device to assign one or more IP addresses to the network device and/or to the device identifier based on the certificate generated by the network controller. In some examples, the network controller may automatically transmit the certificate generated for the network device to the IP allocation device to cause the IP allocation device to assign an IP address for the network device. In some examples, the provisioning platform may cause the IP allocation device to determine whether the network device should be added to other networks associated with the target site and correspondingly assign additional IP addresses as needed.

As further shown in FIG. 4, process 400 may include causing a node configuration to be generated for the network device based on one or more of the IP address, the device identifier, or the site plan (block 480). For example, the provisioning platform (e.g., using a processor 320, a memory 330, a storage component 340, an output component 360, a communication interface 370, and/or the like) may cause a node configuration to be generated for the network device based on one or more of the IP address, the device identifier, or the site plan, as described above. In some implementations, the provisioning platform may transmit a node configuration request to a node configuration device. For example, the node configuration request may include site plan data, a device identifier of the network device, an IP address of the network device, and/or an instruction to cause the node configuration device to generate a node configuration based on the site plan data, the device identifier, and/or the IP address. The provisioning platform may cause the node configuration device to select the appropriate node configuration to use based on the device identifier of the network device, and generate the node configuration according to the site plan data and the IP address.

As further shown in FIG. 4, process 400 may include causing the network device to be provisioned according to the node configuration (block 490). For example, the provisioning platform (e.g., using a processor 320, a memory 330, a storage component 340, an output component 360, a communication interface 370, and/or the like) may cause the network device to be provisioned according to the node configuration, as described above. In some implementations, the provisioning platform may transmit a provisioning request to an element management device. For example, the provisioning request may include site plan data, a device identifier of the network device, an IP address of the network device, and/or an instruction to cause the network device to be provisioned according to the node configuration provided by the node configuration device. The element management device may verify that the node configuration provided by the node configuration device is adapted to operate with the specific network device and the network.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device and from a network storage device, data relating to a site plan for a site of a network;
receiving, by the device and from a client device, image data relating to a network device to be provisioned in the network;
determining, by the device, a device identifier of the network device based on the image data;
querying, by the device, at least one of a first index or a second index for an entry substantially matching the device identifier of the network device,
wherein the first index has been generated to include a first list of device identifiers corresponding to one or more network devices authorized for the site, and
wherein the second index includes a second list of device identifiers corresponding to one or more network devices unauthorized for the site;
associating, by the device, the device identifier of the network device with the site plan based on a common attribute between the network device and the site plan; and
causing, by the device, a certificate to be generated based on transmitting an authentication request to a network controller,
wherein transmitting the authentication request causes the network controller to generate the certificate for the network device based on the device identifier and the site plan, and
wherein the certificate enables enrollment of the network device with the network;
updating, by the device and based on causing the certificate to be generated, the first list of device identifiers of the first index to include the device identifier of the network device;
causing, by the device, an Internet protocol (IP) address to be assigned to the network device based on the certificate;
causing, by the device, a node configuration to be generated for the network device based on one or more of the IP address, the device identifier, or the site plan; and
provisioning, by the device, the network device according to the node configuration.

2. The method of claim 1, wherein receiving the image data comprises:
receiving an image of a visual code associated with the network device,
wherein the visual code corresponds to the device identifier of the network device.

3. The method of claim 1, wherein associating the device identifier with the site plan comprises:
associating the device identifier with the site plan based on determining that a geographic location of the network device corresponds to a geographic location of the site.

4. The method of claim 1, wherein causing the node configuration to be generated comprises:
transmitting a node configuration request to a node configuration device,
wherein the node configuration request includes one or more of the IP address, the device identifier, or the site plan, and
wherein the node configuration request causes the node configuration device to generate the node configuration for the network device.

5. The method of claim 1, wherein provisioning the network device comprises:
transmitting a provisioning request to an element management device,
wherein the provisioning request causes the element management device to transmit the node configuration to the network device.

6. The method of claim 1, wherein the certificate is a first certificate, and the device identifier of the network device is a first device identifier of a first network device; and
wherein the method further comprises:
prohibiting generation of a second certificate based on determining that a second device identifier of a second network device is not associated with the site plan.

7. The method of claim 1, wherein the IP address is a first IP address, the certificate is a first certificate, and the network device is a first network device; and
wherein the method further comprises:
prohibiting assignment of a second IP address based on determining that a second certificate is not generated for a second network device.

8. A device, comprising:
one or more memories; and
one or more processors, communicatively coupled to the one or more memories, to:
receive, from a network storage device, data and site location data relating to a site plan for a site of a network;
receive, from a client device, image data and network device location data relating to a network device to be provisioned in the network;
determine a device identifier of the network device based on the image data;
query at least one of a first index or a second index for an entry substantially matching the device identifier of the network device,
wherein the first index has been generated to include a first list of device identifiers corresponding to one or more network devices authorized for the site, and
wherein the second index includes a second list of device identifiers corresponding to one or more network devices unauthorized for the site;
associate the device identifier of the network device with the site plan based on determining that the network device location data corresponds to the site location data; and
cause a certificate to be generated based on transmitting an authentication request to a network controller,
wherein transmitting the authentication request causes the network controller to generate the certificate for the network device based on the device identifier and the site plan, and
wherein the certificate enables enrollment of the network device with the network; and
update, based on causing the certificate to be generated, the first list of device identifiers of the first index to include the device identifier of the network device.

9. The device of claim 8, wherein the one or more processors, when receiving the image data and the network device location data, are to:
receive an image of a visual code associated with the network device,
wherein the visual code corresponds to the device identifier of the network device; and
receive the network device location data via a location sensor of the client device, wherein the network device location data corresponds to a geographic location of the client device at a time the image was captured.

10. The device of claim 8, wherein the one or more processors, when associating the device identifier with the site plan, are to:
associate the device identifier with the site plan based on determining that the network device location data corresponds to the site location data.

11. The device of claim 8, wherein the one or more processors are further to:
transmit an Internet protocol (IP) reservation request to an IP allocation device,
wherein the IP reservation request causes the IP allocation device to assign an IP address to the network device.

12. The device of claim 8, wherein the one or more processors are further to:
transmit a provisioning request to an element management device,
wherein the provisioning request causes the element management device to transmit a node configuration to the network device.

13. The device of claim 8, wherein the one or more processors are further to:
prohibit generation of the certificate based on determining that the device identifier of the network device is not associated with the site plan.

14. The device of claim 8, wherein the certificate is a first certificate, and the network device is a first network device; and
wherein the one or more processors are further to:
prohibit assignment of an Internet protocol (IP) address based on determining that a second certificate is not generated for a second network device.

15. The device of claim 8, wherein the one or more processors are further to:
cause an Internet protocol (IP) address to be assigned to the network device based on one or more of the certificate or the network device location data;
cause a node configuration to be generated for the network device based on one or more of the IP address, the device identifier, or the site plan; and
provision the network device according to the node configuration.

16. A non-transitory computer-readable medium storing instructions, the instructions comprising:
one or more instructions that, when executed by one or more processors, cause the one or more processors to:
receive, from a network storage device, data relating to a site plan for a site of a network;
receive, from a client device, a device identifier of a network device to be provisioned in the network;
query at least one of a first index or a second index for an entry substantially matching the device identifier of the network device,
wherein the first index has been generated to include a first list of device identifiers corresponding to one or more network devices authorized for the site, and
wherein the second index includes a second list of device identifiers corresponding to one or more network devices unauthorized for the site;
associate the device identifier of the network device with the site plan based on a common attribute between the network device and the site plan;
cause a certificate to be generated based on an authentication request to a network controller,
wherein the authentication request causes the network controller to generate the certificate for the network device based on the device identifier and the site plan, and
wherein the certificate enables enrollment of the network device with the network; and
update, based on causing the certificate to be generated, the first list of device identifiers of the first index to include the device identifier of the network device.

17. The non-transitory computer-readable medium of claim 16, wherein the common attribute relates to a geographic location of the site and a geographic location of the network device,
wherein the site plan includes information relating to the geographic location of the site, and
wherein the geographic location of the network device is received from a location sensor of the client device.

18. The non-transitory computer-readable medium of claim 16, wherein the one or more instructions, that cause the one or more processors to associate the device identifier with the site plan, cause the one or more processors to:
associate the device identifier with the site plan based on determining that a geographic location of the network device corresponds to a geographic location of the site.

19. The non-transitory computer-readable medium of claim 16, wherein the one or more instructions, when executed by the one or more processors, further cause the one or more processors to:
transmit an Internet protocol (IP) reservation request to an IP allocation device,
wherein the IP reservation request causes the IP allocation device to assign an IP address to the network device.

20. The non-transitory computer-readable medium of claim 16, wherein the one or more instructions, when executed by the one or more processors, further cause the one or more processors to:
cause an Internet protocol (IP) address to be assigned to the network device based on one or more of the certificate or a geographic location of the network device;
cause a node configuration to be generated for the network device based on one or more of the IP address, the device identifier, or the site plan; and
provision the network device according to the node configuration.

* * * * *